J. DONNING.

Lamp Burner.

No. 3,158. Reissued Oct. 13, 1868.

Witnesses

Lemuel W. Serrell

Thos. Geo. Harold

Inventor:

James Donning

N. PETERS, Photo-Lithographer, Washington, D. C.

United States Patent Office.

JAMES DONNING, OF BRIDGEPORT, CONNECTICUT.

*Letters Patent No.* 35,925, *dated July* 22, 1862; *reissue No.* 3,158, *dated October* 13, 1868.

IMPROVEMENT IN LAMP-BURNERS.

The Schedule referred to in these Letters Patent and making part of the same.

*To all whom it may concern:*

Be it known that I, JAMES DONNING, of Bridgeport, in the State of Connecticut, (formerly of Paterson, New Jersey,) have invented, made, and applied to use a certain new and useful Improvement in Lamps for burning coal-oil and other material; and I do hereby declare the following to be a full, clear, and exact description of the said invention, reference being had to the annexed drawing, making part of this specification, wherein—

The same letters refer to like parts.

Figure 1:
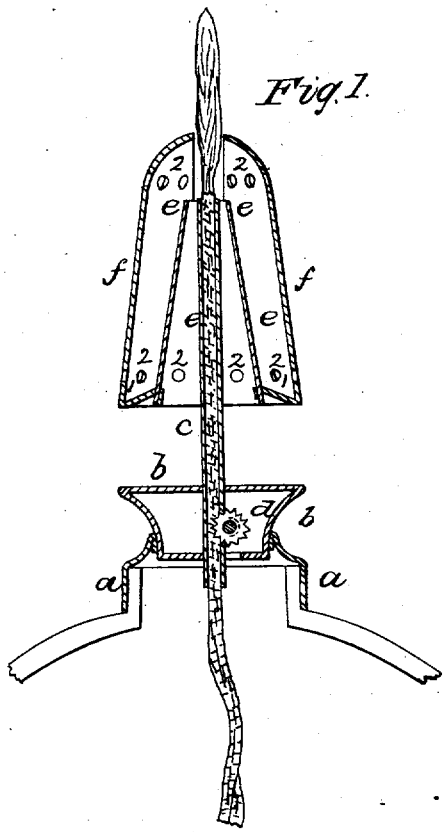
Figure 1 is a vertical section of said lamp.
Figure 2:
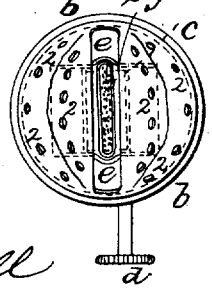
Figure 2 is a plan of the same.

Previous to my present invention, lamps had been made with a conical deflector over the wick-tube, to direct the draught to the flame, and a conical deflector had been employed around the wick-tube, near the base of the flame.

The nature of my said invention consists in the combination of a deflector or cone, to direct the air to the flame, with a sliding support, that sets around the wick-tube and sustains the said deflector, so that the two parts can be removed to give access to the wick-tube and wick, or replaced thereon.

In the drawing—

*a* represents the ring or collar upon the reservoir, for coal-oil or other liquid;

*b*, the ratchet-cap and screw; and

*d* the wick-raiser, of any usual or desired construction.

*c* is the wick-tube.

*e* is the sliding support, sitting upon the wick-tube, and connected to the cone or deflector *f*, so that the two can be removed from or replaced upon the wick-tube. The deflector *f* has a flame-slot in it.

The sliding support *e* is shown with conical sides, leaving an air-space between the sides of the wick-tube and the said support *e*, at the upper end. This allows air to pass to the base of the flame and promote a perfect combustion, and at the same time allows air to pass to the flame, if the sliding support and deflector are removed while the lamp is burning, so as not to extinguish the flame; and when the upper end of this slide *e* is about the same height as the top of the wick-tube, the air being thereby directed into the flame, increases the brilliancy thereof, especially in burners that are adapted to lamps that do not have glass chimneys.

I have shown my invention as employed with this last-named class of burners; and to increase the action of the air upon the flame, the deflector *f* is prolonged downwards, as a skirt or conical body, and holes are provided, as at 2 2, for admitting a current of air to pass through the metallic parts, and aid in keeping them cool.

The connections, 1 1, are shown as uniting the sliding support *e* and the deflector *f*, and the support *e* is also shown as provided with two parallel sides, with grooves formed on their inner faces, to set over the edges of the wick-tube, and be held by the same in position when set upon the wick-tube.

What I claim, and desire to secure by Letters Patent, is—

A deflector or cone, having a flame-slot, in combination with a sliding support, the two being connected together, and removable from the wick-tube, and an air-space being provided between the sliding support and the side of the wick-tube, substantially as specified.

In witness whereof, I have hereunto set my signature, this 20th day of July, A. D. 1868.

JAMES DONNING.

Witnesses:

PATRICK COUGHLIN,

JAMES CAHILL.